United States Patent [19]

Jacobson

[11] 4,205,615
[45] Jun. 3, 1980

[54] SELF-ALIGNING SWIVEL CLAMP

[76] Inventor: Calvin L. Jacobson, 1421 Onyz Drive, Harlan, Iowa 51537

[21] Appl. No.: 928,204

[22] Filed: Jul. 21, 1978

Related U.S. Application Data

[63] Continuation of Ser. No. 651,967, Jan. 23, 1976, abandoned.

[51] Int. Cl.² .......................................... A01C 23/00
[52] U.S. Cl. ...................................... 111/7; 172/705
[58] Field of Search ................. 111/6, 7; 172/705–711

[56] References Cited

U.S. PATENT DOCUMENTS

| 2,924,187 | 2/1960 | Zimmerman | 111/7 |
| 3,294,181 | 12/1966 | Binder | 172/708 |
| 3,319,589 | 5/1967 | Moran | 111/7 |
| 3,469,637 | 9/1969 | Kennedy | 172/709 |
| 3,946,681 | 3/1976 | Sylvester | 111/7 |
| 3,981,472 | 9/1976 | Anderson | 172/705X |

FOREIGN PATENT DOCUMENTS 1386236 12/1964 France ......................................... 111/6

Primary Examiner—Edgar S. Burr
Assistant Examiner—Steven A. Bratlie
Attorney, Agent, or Firm—Henderson & Sturm

[57] ABSTRACT

A tool bar detachably affixed to an offset or tandem disking apparatus. Each of a plurality of clamps mount a tine to the tool bar. The clamps allow the tines to swivel horizontally about a vertical axis, thereby allowing the tines to automatically align with the direction of travel of the disking apparatus.

1 Claim, 6 Drawing Figures

SELF-ALIGNING SWIVEL CLAMP

This is a continuation, of application Ser. No. 651-967 filed on Jan. 23, 1976 now abandoned.

BACKGROUND OF THE INVENTION

This invention relates to fertilizer applicators and the mechanisms for mounting these applicators to tool bars. More particularly this invention relates to fertilizer applicators which use tines variously known as spring tines or vibra tines. These tines are characterized by an arcuate portion which penetrates the ground and a looped portion which is joined to the arcuate portion and acts as a shock absorbing mechanism. Fertilizer hose and conduits are affixed to the rear of the arcuate portions such that, when the tines are drawn through the soil, the tines part the soil immediately in front of the conduits to permit the fertilizer to be properly directed into the soil. Heretofore these tines have been mounted in separate implements having tool bars which were normal to the direction of travel over the field.

It was commonly formerly for farmers to travel over their fields with a tillage apparatus and thereafter to follow back over the fields with a separate implement for applicating fertilizer. More recently, however, it has been realized that great savings of time, money and energy can be had by reducing the number of trips taken across the fields. More frequently now, the operations of tillage and fertilization are being performed simultaneously. Large tractors have been used to draw a tillage implement and a fertilizer implement across the fields in tandem. Such a method, however, is very unwieldy. A more convenient method is to combine the two implements into one as by attaching fertilization equipment to the tillage implement.

The aforementioned spring or vibra tines bearing fertilizer conduits and hoses have been rigidly affixed to chisel plows and other types of tillage implements having tool bars normal to the direction of travel. These tines cannot be used with modern offset or tandem disking implements with present methods of attachment, however, since the tool bars involved are oblique to the direction of travel. Severe twisting forces would soon cause the tines to break. Also, the tines would not adequately shield the applicator conduits from the soil flowing by, and the conduits would soon become clogged resulting in impairment of the placement of fertilizer into the ground. Even where the tool bars involved are normal to the direction of travel over the field, there is still the inconvenience of having to withdraw the tines from the ground in order to make a turn in the field.

SUMMARY OF THE INVENTION

A self-aligning apparatus for the application of fertilizer and a clamp therefor includes a tool bar. The tool bar is attached to an offset or tandem type disk tillage implement. A plurality of spring tines, bearing conduits and hoses which lead from a fertilizer supply tank operably coupled to the tillage implement, are connected to the tool bar each by a clamp. Each clamp includes upper and lower plates which are held against the top and bottom of the tool bar respectively when the clamp is affixed to the tool bar. A portion of each spring tine is vertically disposed and is received through aligned apertures formed in the plates and is rotatable within the apertures. In each spring tine a straight portion joins the vertically disposed portion to the rest of the tine. The straight portion of each tine rests upon, and is slideable over, a bolt suspended from the lower plate of the associated clamp. Each tine, therefore, is free to pivot horizontally about a vertical axis.

It is an object of this invention to provide a fertilizer applicator and clamp therfor which is simple in structure, economical of manufacture and which may be attached to common tillage tools such that the operations of tillage and fertilization may be simultaneously performed, thereby resulting in a reduction in the number of trips made across a field and a consequent savings of energy resources.

Another object of this invention is to provide a fertilizer applicator and clamp therefor such that the applicator in attachment with a tillage implement need not be disengaged from the ground when the tillage implement is turned in the field, thereby resulting in greater convenience and savings of time.

Still another object of this invention is to provide a fertilizer applicator and clamp therefor which may be used over hilly and rough ground with minimum risk of breakage.

Yet another object of this invention is to provide a fertilizer applicator and clamp therefor such that the applicator automatically aligns itself with the direction of travel over the field thereby reducing the incidence of breakage.

A further object of this invention is to provide a clamp such that spring tine type fertilizer applicators may be attached to tool bars oblique to the line of travel over the field, such that the tine automatically aligns itself with the line of travel thereby reducing the incidence of breakage of tines, and such that spring tine type fertilizer applicators may be used with offset and tandem type disk tillage implements while achieving all of the aforementioned objects.

These objects and other features and advantages of this invention of a self-aligning apparatus for application of fertilizer and a clamp therefor will become readily apparent upon referring to the following description, when taken in conjunction with the appended drawings.

BRIEF DESCRIPTION OF THE DRAWINGS

The self-aligning apparatus for application of fertilizer and clamp therefor of this invention is illustrated in the drawings wherein.

DESCRIPTION OF THE PREFERRED EMBODIMENT

Figure 1:
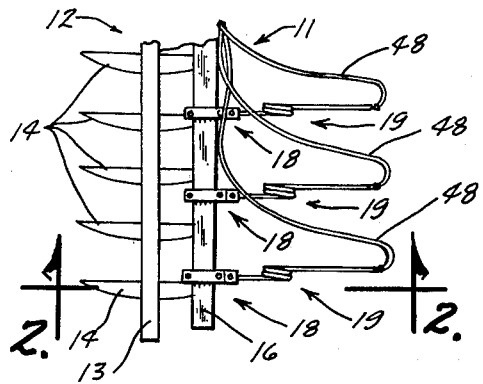
FIG. 1 is a fragmentary, top plan view showing the invention in attachment with a tillage apparatus.
Figure 2:
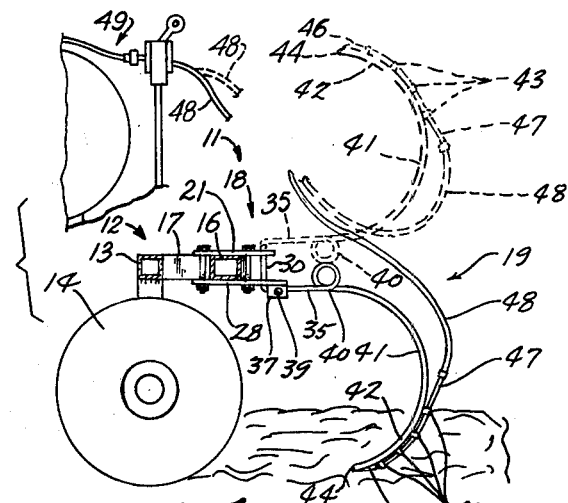
FIG. 2 is an enlarged, fragmentary end elevational view taken along line 2—2 of FIG. 1 with the tool bars shown in section and also showing parts of the fertilizer supply tank.

Referring now to the drawing, the self-aligning apparatus for application of fertilizer and clamp therefor, which comprise this invention, are indicated generally at 11 in FIG. 1 in attachment with a tillage apparatus 12. The tillage apparatus 12 depicted in FIGS. 1 and 2 is a disking apparatus having tool bars 13 which are disposed normal to the direction of travel and is drawn across the ground by a tractor or the like (not shown). However, the disking apparatus 12 may be instead either of the tandem type or of the offset type. Each tool bar 13 bears a plurality of individual disks 14.

A disking apparatus 12 of the offset type includes two tool bars 13. The tool bars 13 are interconnected and are oblique to the direction of travel of the tractor (not shown) and therefore of the disking apparatus 12. The tool bars 13 are disposed in equal proportions on either side of the line of travel and define intersecting lines such that, when viewed in plan, the tool bars 13 indicate a "V" shape. The invention 11 is affixed to the rearmost tool bar 13.

A disking apparatus 12 of the tandem type includes four tool bars 13, each tool bar 13 forming an acute angle with the line of travel. The tool bars 13 are interconnected and, when viewed in plan, indicate an "X" shape, the line of travel passing through the center of the "X". The invention 11 is affixed to the two rearmost tool bars 13 of the disking apparatus 12 of the tandem type.

The self-aligning apparatus for application of fertilizer and clamp therefor 11 (FIGS. 1 and 2) includes more particularly a tool bar 16, a plurality of clamp members 18 and a plurality of tine members 19. The tool bar 16, where the disking apparatus 12 is of the offset type, is affixed to the rearmost tool bar 13 by connecting members 17. The tool bar 16 is disposed in parallel to the rearmost tool bar 13 and is therefore oblique to the direction of travel. The length of the tool bar 16 is bisected by the line of travel. Where the disking apparatus 12 is of the tandem type, the tool bar 16 is in two portions, each affixed by connecting members 17 to one of the two rearmost tool bars 13 and disposed parallel thereto.

Each clamp member 18 (FIGS. 3 and 4) includes an elongated upper plate 21 having front and rear edges 22, 23. The plate 21 has a front aperture 24 formed therethrough adjacent the front edge 22 thereof, and has middle and rear apertures 26, 27 formed therethrough adjacent the rear edge 23 thereof. Each clamp member 18 also has a lower elongated plate 28 having front and rear edges 29, 31. A front aperture 32 is formed through the plate 28 adjacent the front edge 29, and middle and rear apertures 33, 34 are formed through the plate 28 intermediate the edges 29, 31. Right and left plates 36, 37 are affixed to the lower plate 28 perpendicular thereto and adjacent the rear edge 31 and longitudinal edges thereof. The plates 36, 37 are parallel to the longitudinal axis of the plate 28.

Each clamp member 18 is affixed to the tool bar 16 by placing the upper plate 21 against the top of the tool bar 16 and the lower plate 28 against the underside of the tool bar 16. The front apertures 24, 32 are aligned, and a fastening bolt 38 is passed through the aligned apertures 24, 32 and secured as with a nut. Similarly, the middle apertures 26, 33 are aligned next, a fastening bolt 38 being passed therethrough and secured as with a nut. The clamp member 18 thereby is affixed perpendicular to the tool bar 16, the plates 21, 28 being horizontally disposed and the plates 36, 37 being vertically disposed and depending from lower plate 28. While the front edges 22, 29 define a vertical plane, the rear edges 23, 31 do not, the lower plate 28 being longer than the upper plate 21. A detachable bolt 39 is perpendicularly attached between the depending plates 36, 37.

Each tine member 19 (FIGS. 2 and 3) includes a journal portion 25, a loop portion 40 and an arcuate portion 41. The tine 19 is continuously formed, the loop portion 40 interconnecting the journal portion 25 and arcuate portion 41. The journal portion 25 (FIGS. 3 and 4) includes a pivot pin 30 and a straight portion 35 joined together at a right angle. The lower end 42 of the arcuate portion 41 (FIGS. 5 and 6) has a series of loops 43 affixed thereto. The tip 44 of the arcuate portion 41 has a knife portion 46. A conduit or tube 47 is received through the loops 43 of the tine 19. The tube 47 at one end terminates immediately behind the knife portion and at the other end receives a hose 48. The hose 48 connects the conduit 47 to a fertilizer supply tank 49 (FIG. 2).

Figure 3:
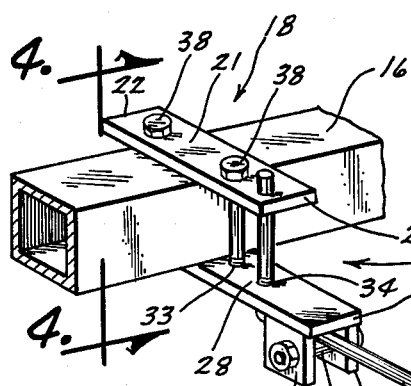
FIG. 3 is an enlarged, fragmentary perspective view of the clamp of this invention.
Figure 4:
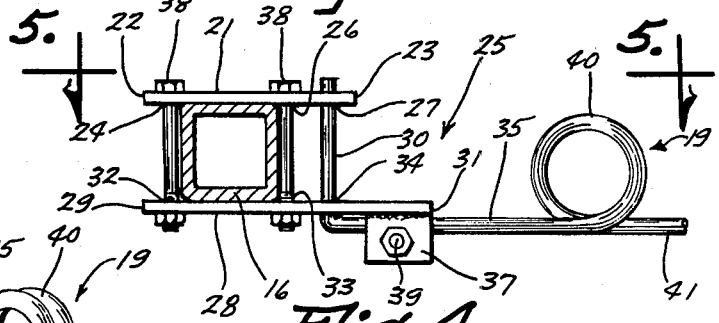
FIG. 4 is an enlarged, fragmentary sectional view taken along line 4—4 of FIG. 3 and depicting the clamp of this invention.
Figure 5:
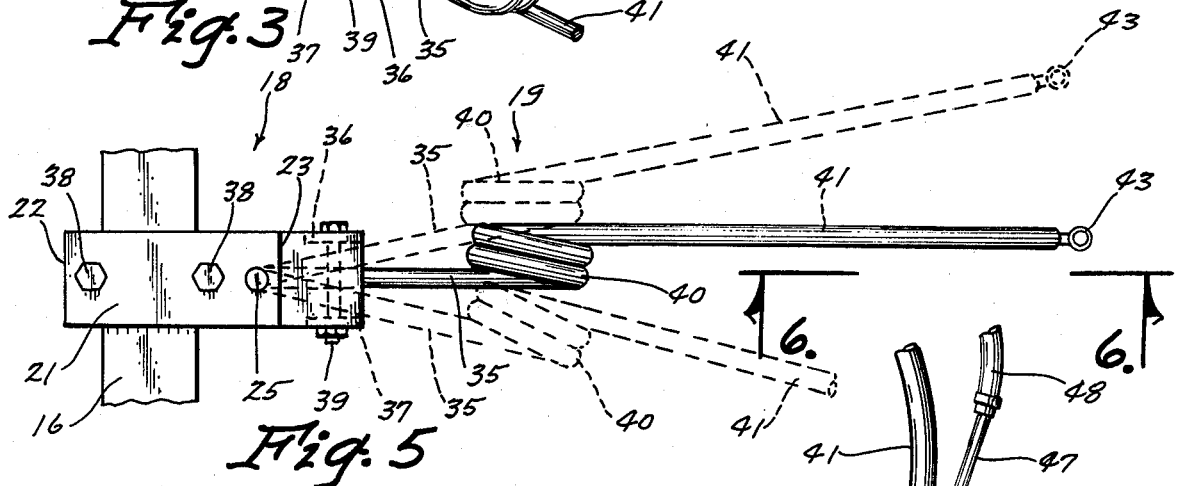
FIG. 5 is an enlarged, fragmentary top plan view taken along line 5—5 of FIG. 4.
Figure 6:
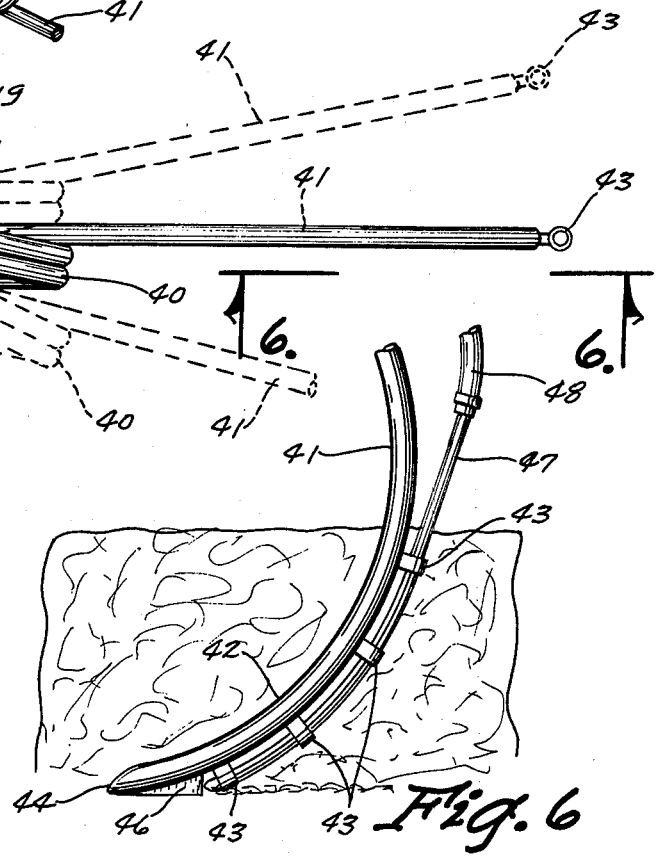
FIG. 6 is an enlarged, fragmentary end elevational view taken along line 6—6 of FIG. 5 and showing the lower portion of the tine used in this invention.

When it is desired that the operations of tilling the soil and of placing fertilizer into the ground be performed simultaneously, each tine 19 is carried by a clamp 18 in the position shown in solid lines in FIG. 2. As shown in FIGS. 3 and 4, the pivot pin 30 is received through the aligned rear apertures 27, 34. The straight portion 35 joins the pivot pin 30 below the lower plate 28 and rests upon the detachable bolt 39. The straight portion 35 extends underneath the lower plate 28, through the opening formed by the bolt 39 and plates 28, 36, 37 and into loop portion 40. Referring to FIG. 5, it is noted that the depending plate members 36 and 37 are spaced apart by a distance of more than three times the width or diameter of tine A. The arcuate portion 41, and particularly the lower end 42 thereof engage the ground (FIGS. 2 and 6) after the disks 14 as the tractor 49 (FIG. 2) draws the disking apparatus 12 across the ground. Fertilizer from the storage tank (not shown) is directed through the hose 48 and tube 47 into the ground directly behind the knife portion 46 at the tip 44 of the tine 19. The loop portion 40 allows for vertical movement of the arcuate portion 41 thereby allowing the tine 19 to withstand shocks imparted thereto by uneven terrain.

As shown in FIG. 5, the pivot pin 30 is rotatable within the aligned rear apertures 27, 34. The straight portion 35 is slideable over the bolt 39 within the limits set by the depending plates 36, 37. Each tine 19 therefore, as shown in hatched lines in FIG. 5, may pivot horizontally about the pivot axis defined by the pin 30 thereof. Frictional engagement with the ground causes each tine 19 to pivot horizontally until the tine 19 is aligned with the direction of travel.

Since the tines 19 automatically swivel to alignment with the direction of travel, the presence of side or twisting forces on the tines 19 are greatly reduced, and therefore the frequency of breakage is reduced. The tines 19 may swivel past obstructions in addition to moving vertically thereover, thereby reducing the likelihood of breakage and further permitting the usage of the tines 19 on hilly ground. Also since the tines 19 may swivel, the tractor (now shown), tillage apparatus 12 and invention 11 may be turned around while the tines 19 are in engagement with the ground. Additionally since the tines 19 swivel, the tips 44 of the tines 19 and the knife portions 46 thereon shield the openings of the tubes 47 from the soil flowing by, thereby assuring that the tubes 47 remain unclogged and that the fertilizer is properly deposited.

When it is desired that only the operation of tilling the soil be performed, the bolts 39 are removed from the plates 36, 37 and the tines 19 are removed from the clamps 18, the pivot pins 30 sliding out of the aligned rear apertures 27, 34. The tines 19 are inverted, and the pivot pins 30 are reinserted through the apertures 27, 34. The bolts 39 may be reaffixed to the plates 36, 37. The tines 19 are then carried in the inverted position shown in hatched lines in FIG. 2 while the tillage operation is undertaken.

It can be seen, then, that individual tines 19 may be easily changed. It can further be seen that the tines 19 may be easily moved to and carried in an inverted position without disconnecting the fertilizer hoses. The operations of tillage and fertilization may be performed one day, the operation tillage alone the next day, and the operation of tillage and fertilization together again the third day, all without completely removing the invention 11. Being able to perform both tillage and fertilization operations simultaneously minimizes the number of trips which must be made across the field and therefore results in conservation of energy. The use of the clamps 18 of this invention permit the use of tines 19 for fertilizing operations in combination with tillage operations using the offset or tandem disking apparatus 12 having tool bars 13 which are not normal to the direction of travel. Thus it can be seen that the objects of this invention have been attained.

Although a preferred embodiment has been disclosed herein, it is to be remembered that various modifications and alternate constructions can be made thereto without departing from the full scope of the invention, as defined in the appended claims.

I claim:

1. A fertilizer applicator for use with a tillage apparatus and a fertilizer supply tank, the tank being coupled to the tillage apparatus and having a plurality of supply hoses extending therefrom said fertilizer applicator comprising;

a tool bar detachably affixed to the tillage apparatus;

a plurality of vibra spring tines, each tine being continuously formed and having a ground engageable arcuate portion, a looped portion and a journal portion, said looped portion interconnecting said arcuate portion and said journal portion; a supply hose being received by said arcuate portion; and a plurality of means for clamping, affixed to said tool bar, each means for clamping receiving said journal portion of one of said tines, said looped portions of said tines being held in horizontal disposition by said means for clamping, said means for clamping permitting pivotal movement of said journal portions such that said looped portions swing in a horizontal plane, each means for clamping including a first plate and a second plate, said first and second plates being disposed in parallel and being attached to said tool bar, said first plate being disposed above said tool bar, said second plate being disposed below said tool bar, and first and second plates extending beyond said tool bar an equal distance on one side of the tool bar, and an unequal distance on the other side of the tool bar, said first plate being shorter in length than said second plate, both said first and said second plates having three apertures, front, middle and rear, formed there through, said front apertures positioned on said one side of the tool bar, said middle and said rear apertures positioned on said other side of said tool bar, said middle apertures located adjacent the tool bar, and said rear apertures located at a position remote from the tool bar, said apertures being vertically aligned, said second plate including depending plate members located at a position more remote from the tool bar than the position of said rear apertures, said depending plate members having a slide bolt member attached therebetween, said journal portion being rotatably received through said rear apertures and slideably received upon said slide bolt member, whereby said tines are made self-adjusting to align parallel to the direction of travel of the tillage apparatus when said tines engage the ground.

* * * * *